United States Patent [19]

Ishihara

[11] Patent Number: 4,751,140
[45] Date of Patent: Jun. 14, 1988

[54] HIGH-BRIGHTNESS PAVEMENT MARKING SHEET MATERIAL

[75] Inventor: Yuji Ishihara, Sano, Japan

[73] Assignee: Seibu Polymer Kasei Kabushiki Kaisha, Tokyo, Japan

[21] Appl. No.: 786,796

[22] Filed: Oct. 11, 1985

[30] Foreign Application Priority Data

Oct. 22, 1984 [JP] Japan ................ 59-222636

[51] Int. Cl.⁴ ............................................. B32B 5/16
[52] U.S. Cl. .................................... 428/324; 428/325;
428/332; 428/412; 404/4; 404/10; 404/14;
404/16
[58] Field of Search ............... 428/325, 324, 332, 412;
427/137, 204; 350/103; 404/4, 10, 14, 16

[56] References Cited

U.S. PATENT DOCUMENTS

| 3,030,870 | 4/1962 | Gill, Jr. ............................. 94/1.5 |
| 3,036,928 | 5/1962 | Poole ................................ 117/33 |
| 3,746,425 | 7/1973 | Eigenmann ...................... 350/109 |
| 3,915,771 | 10/1975 | Gatzke et al. .................... 156/71 |
| 4,020,211 | 4/1977 | Eigenmann ...................... 428/323 |
| 4,069,281 | 1/1978 | Eigenmann ...................... 264/1 |
| 4,102,562 | 7/1978 | Harper et al. ................... 350/105 |
| 4,117,192 | 9/1978 | Jorgensen ........................ 428/337 |
| 4,145,112 | 3/1979 | Crone et al. ..................... 350/103 |
| 4,248,748 | 2/1981 | McGrath et al. ............... 260/27 R |
| 4,248,932 | 2/1981 | Tung et al. ...................... 428/325 |
| 4,282,281 | 8/1981 | Ethen .............................. 428/149 |
| 4,299,874 | 11/1981 | Jones et al. ..................... 428/143 |
| 4,388,359 | 6/1983 | Ethen et al. .................... 428/143 |
| 4,469,645 | 9/1984 | Eigenmann ..................... 264/1.6 |
| 4,490,432 | 12/1984 | Jordan ............................ 428/220 |
| 4,564,556 | 1/1986 | Lange .............................. 428/325 |

Primary Examiner—John E. Kittle
Assistant Examiner—Patrick J. Ryan
Attorney, Agent, or Firm—Koda and Androlia

[57] ABSTRACT

In a high-brightness pavement marking sheet material, a continuous pattern of a multiplicity of protuberances and depressions is formed on the surface of a base sheet made of rubber, synthetic resin or the like and that glass microspheres are embedded in these protuberances and depressions in such a manner that a depth of embedding of these glass microspheres in the base sheet from the surface is randomly different one from another and a majority of the glass microspheres in these protuberances and depressions are partially exposed from the surface of the base sheet. An excellent initial brightness is obtained and brightness at a high level is continuously maintained despite wear of the base sheet.

3 Claims, 2 Drawing Sheets

FIG. I

HIGH-BRIGHTNESS PAVEMENT MARKING SHEET MATERIAL

BACKGROUND OF THE INVENTION

This invention relates to a pavement marking sheet material and, more particularly, to a high-brightness pavement marking sheet material having a high initial brightness in reflection and enjoying timewise continuity in the brightness in reflection.

There are various types of prior art sheet materials used for pavement marking purposes in a state in which they are bonded to the pavement surface.

Typical ones of these prior art pavement marking sheet materials are of a generally flat sheet surface and can be classified into four types: namely (1) those having a monolayer of glass microspheres partially embedded in the base sheet and partially exposed from the surface of the base sheet to the air (e.g. the specification of U.S. Pat. No. 3,915,771), (2) those having a monolayer of glass microspheres partially embedded in the base sheet and partially exposed from the surface of the base sheet to the air and further having glass microspheres dispersed and completely embedded in the base sheet (e.g., the specification of U.S. Pat. No. 3,030,870), (3) those having two layers of a support sheet and a base sheet and having a monolayer of glass microspheres partially embedded in the support sheet and partially exposed from the surface of the support sheet to the air (e.g., the specification of Japanese preliminary patent publication No. 3707/1981 and the specification of U.S. Pat. No. 4,248,932) and (4) those having two layers of a support sheet and a base sheet and having a monolayer of glass microspheres partially embedded in the support sheet and partially exposed from the surface of the support sheet to the air and further having glass microspheres dispersed and completely embedded in the base sheet (e.g., the specification of U.S. Pat. No. 4,117,192).

The above-described prior art pavement marking sheet materials have the common drawbacks that an amount of glass microspheres which can be dispersed on the surface of the sheet is restricted because the employment of an excessive amount of glass microspheres causes slippage of vehicles running over the sheet and that, when light is incident at a large angle to a normal of the surface of the sheet i.e., obliquely with respect to the surface of the sheet, an amount of reflection back towards the light source is greatly reduced with a resulting sharp decrease in the brightness in reflection. Further, these prior art sheet materials have the drawback that they lack in timewise continuity of reflection of light because, after the layer of glass microspheres on the surface of the sheet has been lost due to collision with wheels of the passing vehicle, the sheet materials of the above-described types (1) and (3) entirely ceases reflection of light and those of the above-described types (2) and (4) take a considerable length of time before glass microspheres of a next layer become exposed from the surface of the sheet so that the sheet scarcely reflects light or reduces its brightness in reflection during this period of time.

SUMMARY OF THE INVENTION

It is, therefore, an object of the invention to eliminate the above-described disadvantages of the prior art pavement marking sheet materials and provide a high-brightness pavement marking sheet material having a high initial brightness in reflection in an initial period of use of the sheet material, being capable of retroreflecting a sufficient amount of light toward its light source, no matter which direction the light may be incident from, and further having a sufficient timewise continuity in the brightness in reflection.

The pavement marking sheet material achieving the above-described object of the invention is characterized in that a continuous pattern of a multiplicity of protuberances and depressions is formed on the surface of a base sheet made of rubber, synthetic resin or the like and that glass microspheres are embedded in these protuberances and depressions in such a manner that a depth of embedding of these glass microspheres in the base sheet from the surface is randomly different one from another and a majority of the glass microspheres in these protuberances and depressions are partially exposed from the surface, of the base sheet.

As a result of laborious study and repeated experiments, the inventor of the present invention has confirmed that the sheet material of the above-described construction can provide the maximum initial brightness in reflection which is not available in any of the prior art pavement marking sheet materials. Furthermore, according to the present invention, owing to the construction that the glass microspheres are embedded in the surface portion of each protuberance and depression in such a manner that the depth of embedding of the glass microspheres from the surface of each protuberance and depression is randomly different one from another, the loss or sharp decrease in the brightness in reflection as in the prior art sheet materials never occurs even when the brightness decreases due to coming off of the glass microspheres caused by contact with wheels of the passing vehicle but a high brightness in reflection is maintained for a long period of time. Since the depth of embedding of the glass microspheres embedded in the surface portion of each protuberance and depression is randomly different, when the glass microspheres contact wheels of the passing vehicle, the glass microspheres come off one after another in the order of the depth of embedding, i.e., a glass microsphere of a smaller depth of embedding coming off earlier, and never come off substantially all at once as in the prior art pavement marking sheet materials. Accordingly, the sheet material of the present invention can maintain a brightness in reflection which is excellent as compared with the prior art sheet materials until a layer of glass microspheres of the largest depth of embedding comes off and extra glass microspheres, if any, embedded inside the base sheet become exposed to the air.

Thus, the construction that the depth of embedding of the glass microspheres embedded in the surface portion of the protuberances and depressions of the base sheet is randomly different one from another is a novel feature of the present invention which is not found in any of the prior art pavement marking sheet materials.

The sheet material of the present invention will now be described more specifically in conjunction with the accompanying drawings.

BRIEF DESCRIPTION OF THE DRAWINGS

In the accompanying drawings.

DESCRIPTION OF PREFERRED EMBODIMENT

Figure 1:
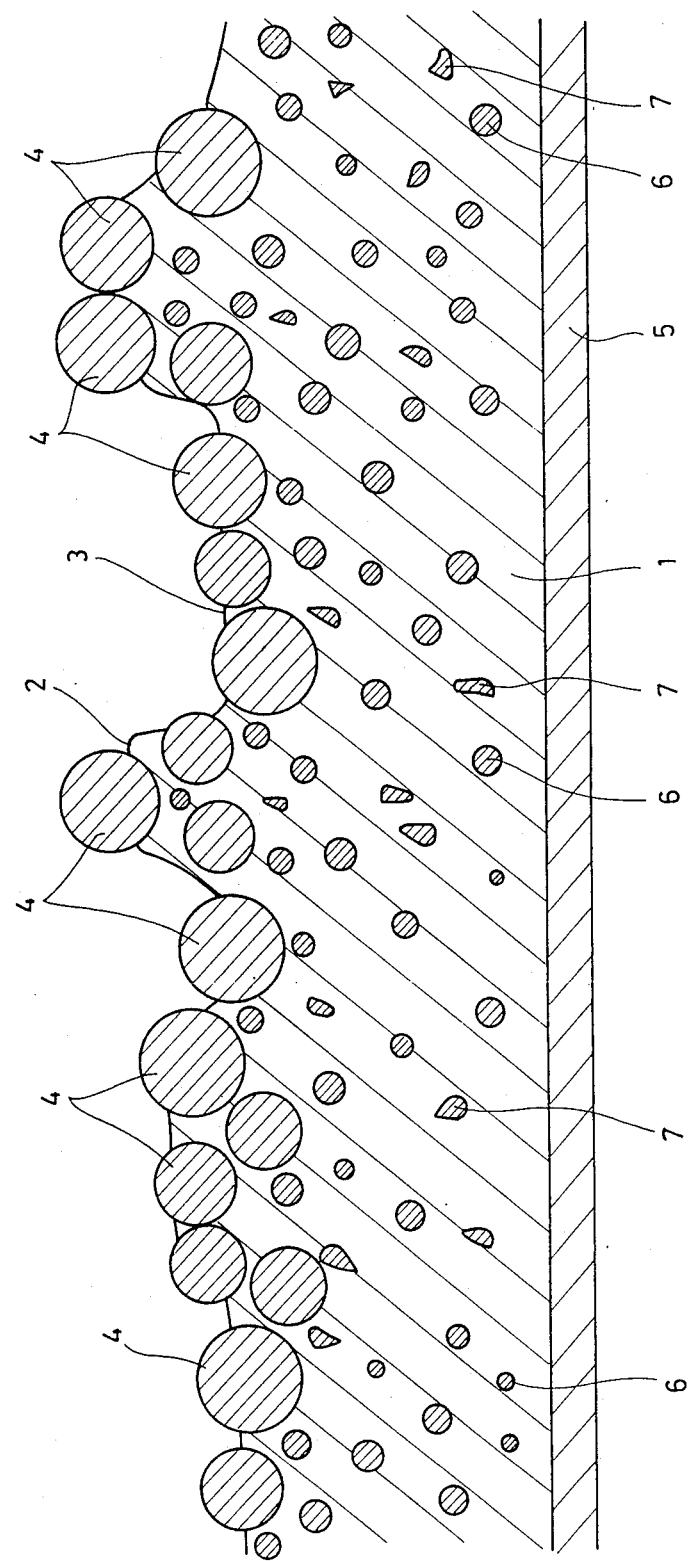
FIG. 1 is an enlarged sectional view schematically showing an embodiment of the pavement marking sheet material according to the invention and FIG. 2 is a graph showing experimental data of the initial brightness in reflection and continuity of brightness of the pavement marking sheet material of the invention in comparison with a commercially available prior art sheet material.

FIG. 1 is an enlarged sectional view schematically showing an embodiment of the sheet material of the invention. A continuous pattern of a multiplicity of protuberances 2 and depressions 3 of random shapes and dimensions is formed on the surface of a base sheet 1. A multiplicity of glass microspheres 4 are embedded in the surface portion of these protuberances 2 and depressions 3. These glass microspheres 4 are embedded in the base sheet 1 in such a manner that a depth of embedding of the glass microspheres 4 in the base sheet 1 from the surface of each protuberance 2 and depression 3 is randomly different one from another. A majority of the glass microspheres in these protuberances 2 and depressions 3 are partially exposed from the surface of the base sheet 1 and the height of the exposed portion of these partially exposed glass microspheres is randomly different one from another.

The base sheet requires to be made of a material having excellent conformability to the irregular pavement surface and durability to various mechanical forces. The base sheet therefore comprises, as its main ingredient, unvulcanized synthetic rubber such, for example, as acrilonitrile-butadiene rubber (NBR), isobutylene-isoprene rubber (IIR) and chloroprene rubber (CR) or a synthetic resin such, for example, as chloro-sulphonyl-polyethylene and polyvinyl chloride. The base sheet 1 may comprise, if necessary, additives including a filler such as calcium carbonate powder, a pigment for providing color to the base sheet, small glass microspheres (designated by reference numeral 6 in FIG. 1) and wear resisting particles (designated by reference numeral 7). The mixture of these ingredients is formed into a sheet with a thickness of 5 mm or less by passing it through pressure rolls or by other conventional methods. If the small glass microspheres 6 are mixed in the base sheet 1, small glass microspheres having a diameter not exceeding about 500 $\mu$m may be employed. Those of about 100 $\mu$m in average diameter may be conveniently used. The glass microspheres 4 are embedded in the surface portion of the protuberances 2 and depressions 3 of the base sheet 1 with the depth of embedding being randomly different one from another. As the glass microspheres 4, those having a diameter not exceeding about 1,000 $\mu$m may be used and preferably are of an average diameter of 50 $\mu$m–500 $\mu$m. As to refractive index, microspheres having refractive index of 1.3 or more, and preferably 1.5–2.3, may be used. A protective film of a suitable composition may be provided over the surface of the base sheet 1 in which the glass microspheres 4 are embedded. An adhesive layer 5 of a suitable thickness of 50 $\mu$m or more, preferably 100 $\mu$m–200 $\mu$m, is provided under the lower surface of the base sheet 1. A release paper is normally attached to the lower surface of the adhesive layer 5 but it may be omitted depending upon the type of the adhesive employed in the adhesive layer 5.

For making the sheet material of the present invention, the unvulcanized synthetic rubber or synthetic resin which is an ingredient of the base sheet 1 is added with desired amounts of the filler, pigment, glass microspheres and other materials if required. The mixture is blended and is formed into a sheet of a thickness of 5 mm or less through heated pressure rolls. If necessary, an adhesive coated on a release paper in a thickness of 50 $\mu$m or more is superposed on the lower surface of the base sheet 1.

For facilitating embedding of the glass microspheres 4 into the base sheet 1, a solvent of a known type is coated on the surface of the base sheet 1 and the glass microspheres 4 are uniformly dispersed on an undried surface of the solvent and then the base sheet 1 is dried. As alternative means for facilitating embedding of the glass microspheres 4, a coating material which is of a composition identical or similar to that of the base sheet 1 may be coated on the surface of the base sheet 1. Then, the base sheet 1 on which the glass microspheres 4 are dispersed is passed through an embossing device so that an embossed pattern of desired shape and dimensions is formed and simultaneously the glass microspheres 4 are embedded in the surface portion of each protuberance 2 and depression 3 of the base sheet 1 thus formed by the embossing.

The embossing device used in making the sheet material of the invention is one whose protuberances and depressions respectively are not of a flat surface, if viewed in an enlarged scale, but are formed with a multitude of small depressions with depth and diameter ranging from several tens microns to several hundred microns. By virtue of employing this embossing device, in carrying out the embossing process, many of the glass microspheres 4 are engaged in these small depressions formed on each of the surfaces of the protuberances and depressions constituting the embossing pattern of the embossing device and, accordingly, the material of the base sheet 1 entering each of these small depressions is stopped at a line along which the glass microsphere is engaged with the inside wall of the small depression and thereby is prevented from further entering the inside of the small depression to enclose the glass microsphere entirely by the material of the base sheet 1. Since the shape, diameter and depth of these small depressions are not uniform on one hand and the diameter of the glass microspheres 4 is varied within a certain range on the other, position of engagement of the glass microspheres 4 in the small depressions is infinitely varied depending upon combination of each individual small depression and each individual glass microsphere.

Accordingly, a multiplicity of glass microspheres 4 whose depth of embedding is randomly different one from another are embedded in the surface portion of the respective protuberances 2 and depressions 3 of the base sheet 1 formed through the embossing process. If necessary, the surface of the embossed base sheet 1 is treated with a releasing agent. The base sheet 1 thereafter is dried and wound into a roll to provide a finished product.

The method of providing protuberances and depressions on the surface of the base sheet 1 is not limited to the above described embossing process but any other method capable of forming a multitude of continuous protuberances and depressions may be employed. In case the embossing device is employed, it is effective in some case to apply the embossing process twice depending upon the embossing pattern of the embossing device used.

EXAMPLE

The following ingredients were used for producing the base sheet 1:

| | | |
|---|---|---|
| NBR | 85 | (parts by weight) |
| TiO$_2$ | 100 | |
| CaCO$_3$ | 140 | |
| petroleum resin | 15 | |
| small glass microspheres (average diameter 100 μm) | 140 | |

These materials were blended and formed into a sheet having a thickness of 1.2 mm and a width of 1,000 mm through an extrusion process at a processing temperature 90° C. The sheet was once wound and then, as the sheet was unwound, a releasing paper coated with pressure sensitive adhesive was superposed on the lower surface of the sheet. The sheet was wound again. Then, the sheet was unwound and toluol was coated on the surface of the base sheet in a coating amount of 5 g-6 g. Glass microspheres having an average diameter of 350 μm and refractive index of 1.50 were uniformly dispersed over the undried surface of the base sheet. The base sheet was then dried at 80° C. for 5 minutes.

The base sheet was then passed through an embossing device at an embossing temperature of 80° C. whereby the glass microspheres were densely embedded in the surface portion of protuberances and depressions formed on the base sheet. For providing a layer of releasing agent on the surface of the base sheet thus having the glass microspheres embedded therein, a releasing agent comprising a synthetic resin as a main ingredient was coated on the base sheet. The base sheet was then dried and wound into a roll to provide a finished product. Since an excessive thickness of the releasing agent layer decreases the brightness in reflection, the coating thickness of the releasing agent on the glass microspheres should be less than about 2 μm.

Figure 2:
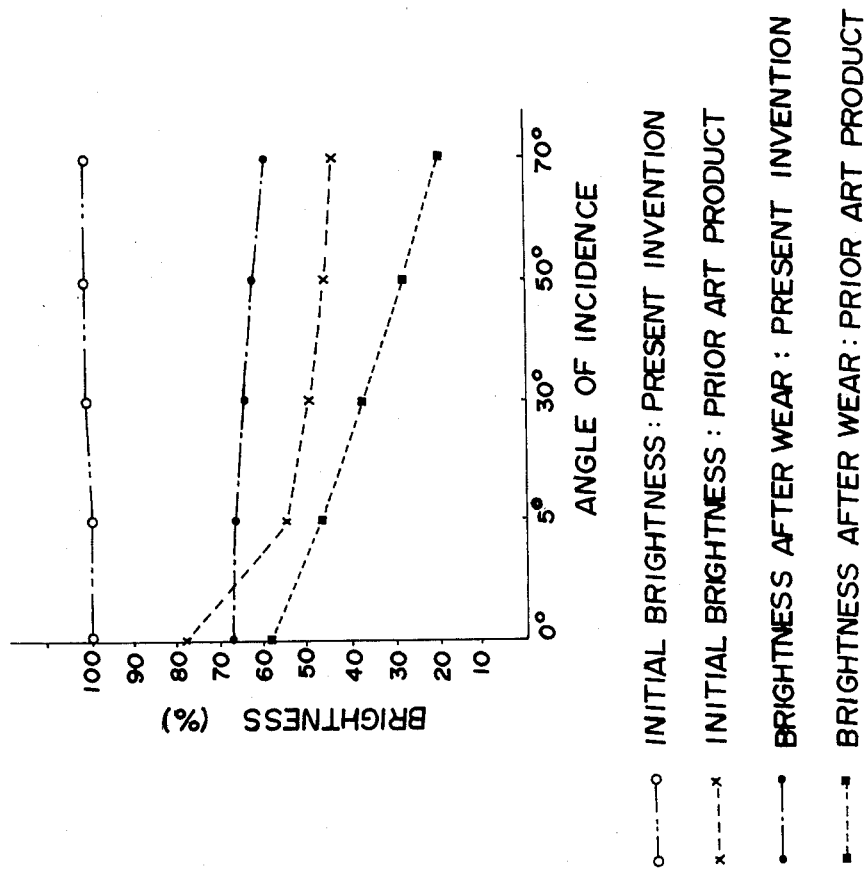

According to the invention, since a continuous pattern of a multiplicity of protuberances and depressions is formed on the surface of the base sheet and a multiplicity of glass microspheres are embedded in the surface portion of these protuberances and depressions, an initial brightness in reflection which, as shown in the graph of FIG. 2, is by far larger than the prior art sheet materials can be obtained and a sufficient amount of light can be reflected back toward its light source, no matter which direction the light may be incident from.

Further, since the glass microspheres are embedded in the surface portion of these protuberances and depressions of the base sheet in such a manner that the depth of embedding is randomly different one from another, the glass microspheres come off one after another in the order of the depth of embedding, i.e., a glass microsphere of a smaller depth of embedding coming off earlier and a brightness in reflection which is excellent as compared with the prior art sheet materials is maintained until a layer of glass microspheres of the largest depth of embedding comes off. If small glass microspheres 6 are embedded inside of the base sheet, these small glass microspheres 6 become exposed to the air while the successive coming off of the glass microspheres in the surface portion is continuing so that a high brightness in reflection can be further maintained. If a multitude of the glass microspheres are embedded concentrically in the surface portion of the protuberances and depressions, an even higher initial brightness can be obtained and, moreover, glass microspheres of different depths of embedding become successively exposed upon coming off of glass microspheres of smaller depths of embedding so that brightness of reflection at a high level is continuously maintained.

FIG. 2 is a graph showing experimental data which proves advantageous results of the present invention. The graph shows an initial brightness in reflection measured with respect to samples having a width of 10 cm of the pavement marking sheet material of the invention and of a prior art pavement marking sheet material of the type in which a monolayer of glass microspheres is partially embedded in the surface portion with a substantially flat surface. The graph also shows brightness in reflection of each of these samples measured after these samples have been respectively abrased by a roll of 10 kg in weight by rotating the roll by 14,400 revolutions. The results of these experiments are indicated in percentage with the initial brightness of the sheet material of the invention being indicated as 100%. These experiments were conducted in accordance with JIS Z9117 at an observation angle of 0.2°.

I claim:

1. A high-brightness pavement marking sheet material comprising:

a base sheet made of rubber, synthetic resin or the like and formed on the surface thereof with a continuous pattern of a multiplicity of protuberances and depressions, and glass microspheres embedded in these protuberances and depressions in such a manner that a depth of embedding of these glass microspheres in the base sheet from the surface is randomly different one from another in the protuberances and depressions and a majority of the glass microspheres in these protuberances and depressions are partially exposed from the surface of the base sheet.

2. A pavement marking sheet material as defined in claim 1 wherein said glass microspheres are of an average diameter of 50 μm-500 μm.

3. A pavement marking sheet material as defined in claim 1 wherein said glass microspheres have refractive index of 1.5-2.3.

* * * * *